US012278035B2

(12) United States Patent
Anda

(10) Patent No.: US 12,278,035 B2
(45) Date of Patent: Apr. 15, 2025

(54) METHOD FOR INSULATION OF COIL OF TOROID TRANSFORMERS

(71) Applicant: HUN-REN ENERGIATUDOMÁNYI KUTATÓKÖZPONT, Budapest (HU)

(72) Inventor: Gábor Anda, Budapest (HU)

(73) Assignee: Hun-Ren Energiatudományi Kutatóközpont, Budapest (HU)

( * ) Notice: Subject to any disclaimer, the term of this patent is extended or adjusted under 35 U.S.C. 154(b) by 837 days.

(21) Appl. No.: 17/425,740

(22) PCT Filed: Jan. 24, 2020

(86) PCT No.: PCT/HU2020/050004

§ 371 (c)(1),
(2) Date: Jul. 26, 2021

(87) PCT Pub. No.: WO2020/152486

PCT Pub. Date: Jul. 30, 2020

(65) Prior Publication Data

US 2022/0093310 A1 Mar. 24, 2022

(30) Foreign Application Priority Data

Jan. 25, 2019 (HU) .................................... P1900028

(51) Int. Cl.
*H01F 7/06* (2006.01)
*H01F 27/02* (2006.01)
(Continued)

(52) U.S. Cl.
CPC ........... *H01F 27/02* (2013.01); *H01F 27/324* (2013.01); *H01F 30/16* (2013.01); *H01F 41/005* (2013.01);
(Continued)

(58) Field of Classification Search
CPC ...... H01F 41/125; H01F 27/324; H01F 30/16; H01F 41/005; H01F 41/0206; H01F 27/02; H01F 27/2895
See application file for complete search history.

(56) References Cited

U.S. PATENT DOCUMENTS 4,551,700 A 11/1985 Waldemar
6,300,857 B1 10/2001 Herwig
(Continued)

FOREIGN PATENT DOCUMENTS

CN 106653300 A 5/2017
DE 8533153 U1 5/1987
(Continued)

OTHER PUBLICATIONS

Bonten C: "Serienschweissen Von Kinststoffteilen/Ein Ueberblick Zum Stand Der Technik," Kunststoffe, Carl Hanser Verlag, Munchen, DE, p. 38, vol. 89, No. 8, Aug. 1, 1999, XP000954838, ISSN: 0023-5563.
(Continued)

*Primary Examiner* — Paul D Kim
(74) *Attorney, Agent, or Firm* — Allen, Dyer, Doppelt + Gilchrist, PA

(57) ABSTRACT

A method of insulating a coil of a toroidal transformer includes forming an opening in an electrically insulating thermoplastic cup receiving a core with a coil for leading through terminals of the coil, arranging the core with the coil in the cup with the coil terminals led out of through the opening, covering the cup with a plastic lid which engages the cup, and temporarily fixing the cup in an irrotatable manner. The method further includes joining the cup and the lid by rotary welding by pressing the lid against the cup and rotating until the lid and the cup heat up and their material soften and become viscous due to friction, and stopping the rotation of the lid within not more than one second after
(Continued)

softening while maintaining the pressure of the lid and the cup to join their mixed material to form a continuous electrical insulation.

7 Claims, 1 Drawing Sheet

(51) Int. Cl.

| | |
|---|---|
| ***H01F 27/32*** | (2006.01) |
| ***H01F 30/16*** | (2006.01) |
| ***H01F 41/00*** | (2006.01) |
| ***H01F 41/02*** | (2006.01) |
| ***H01F 41/12*** | (2006.01) |

(52) U.S. Cl.
CPC ....... *H01F 41/0206* (2013.01); *H01F 41/125* (2013.01)

(56) References Cited

U.S. PATENT DOCUMENTS

| | | | | |
|---|---|---|---|---|
| 6,753,749 | B1 | 6/2004 | Chin | |
| 10,902,993 | B2 * | 1/2021 | Rylko | H01F 27/306 |
| 2013/0176097 | A1 * | 7/2013 | Yamada | H01F 30/06<br>336/220 |
| 2019/0058374 | A1 * | 2/2019 | Enomoto | F28D 15/04 |

FOREIGN PATENT DOCUMENTS

| | | | |
|---|---|---|---|
| DE | 8713252 | U1 | 12/1987 |
| EP | 0557549 | A1 | 9/1993 |
| FR | 2721137 | A1 | 12/1995 |

OTHER PUBLICATIONS

International Search Report and Written Opinion; PCT/HU2020/050004; Jul. 21, 2020; entire document.

* cited by examiner

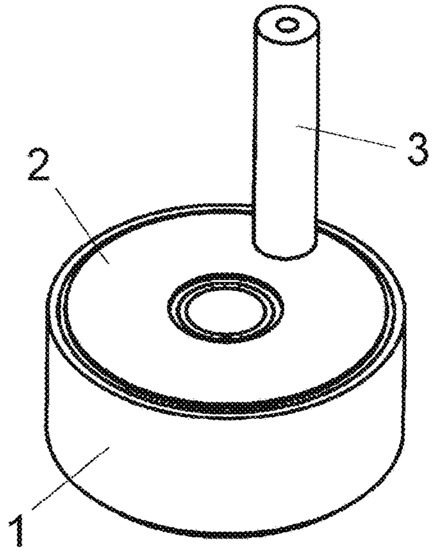
Fig. 1
Fig. 2
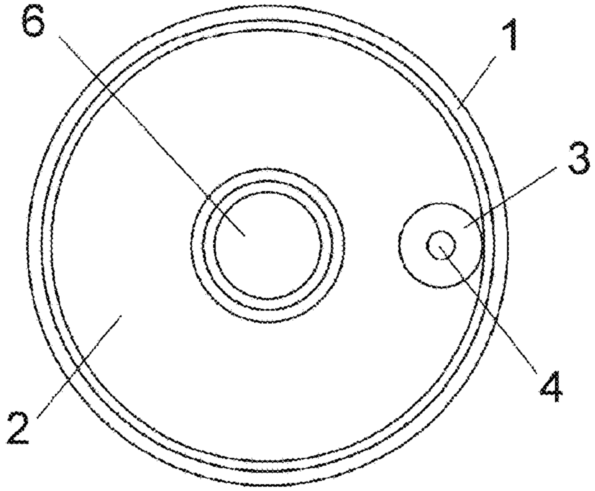
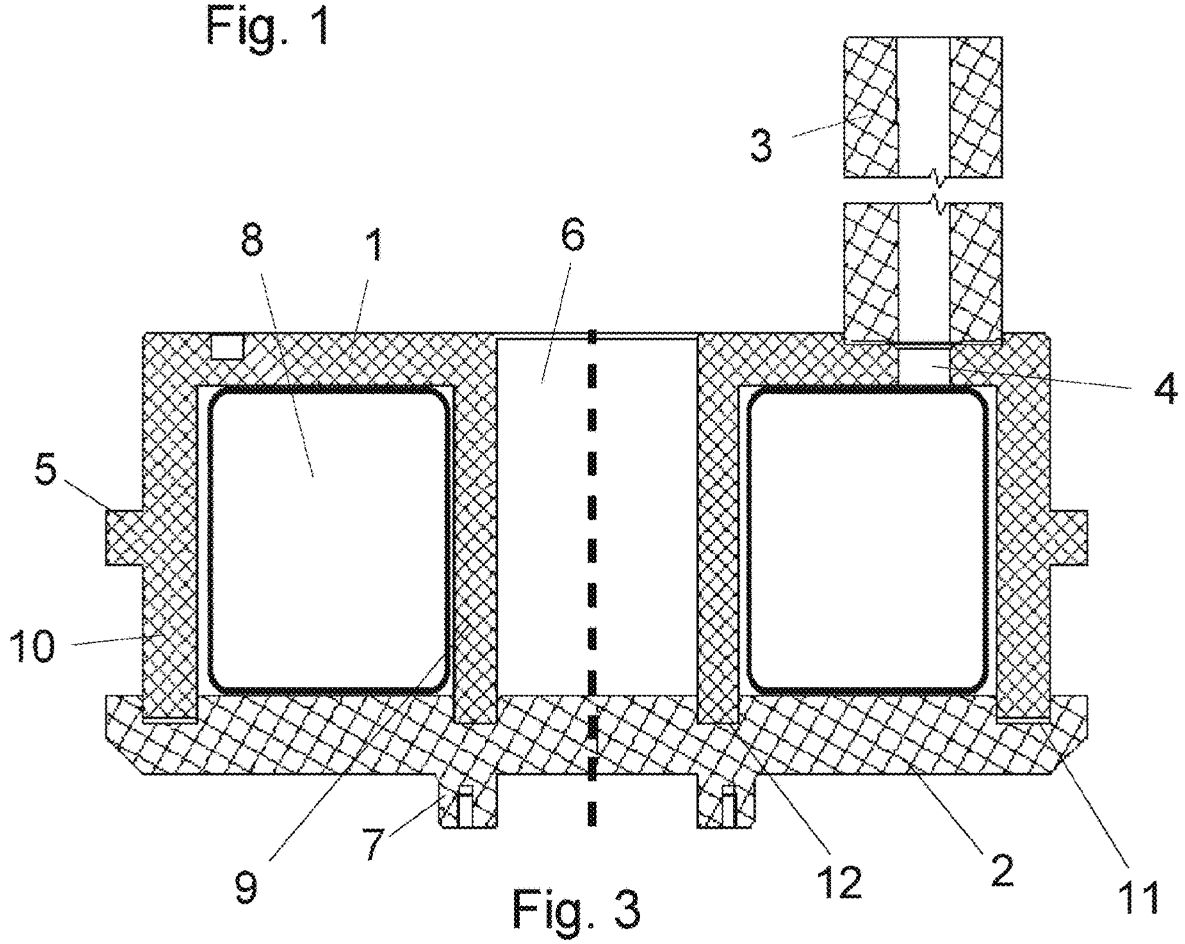
Fig. 3

METHOD FOR INSULATION OF COIL OF TOROID TRANSFORMERS

CROSS-REFERENCE TO RELATED APPLICATIONS

This application is the § 371 National Stage Entry of International Application No. PCT/HU2020/050004, filed on Jan. 24, 2020, which claims the benefit of Hungarian Patent Application No. P1900028, filed on Jan. 25, 2019, the contents of which applications are herein incorporated by reference in their entirety.

FIELD OF THE INVENTION

The invention relates to a method for insulating a coil of a toroidal transformer during which one or more coils arranged on a core of a toroidal transformer are provided with an external insulation

BACKGROUND OF THE INVENTION

Known transformers used for power transmission comprise an iron core, as well as primary and secondary coils. Of the coils, one or more coils connected to the feed side are generally referred to as primary coils, and one or more coils for the output side are referred to as secondary coils. The coils are electrically insulated from both the core and each other, where the requirements for insulation are determined by the type, voltage, and sometimes other requirements of the transformers. A transformer is stressed during operation on the one hand by the constant operating voltage and, on the other hand, by occasional overvoltages for various reasons. The larger the voltage difference, the more critical the implementation of the insulation of the transformer, including the insulation of the coils. A transformer may comprise more than one primary and/or secondary coil.

According to a known technical solution primary and secondary coils of the transformer are insulated from each other by resin casting. This solution is limited by the physical size of the transformer and has the disadvantage of time consuming resin casting and the increased weight and size of the finished transformer. A further disadvantage is that the resin casting has a drying time of up to several weeks.

According to another known solution suitable in the art mostly for insulating high-power transformers the primary and secondary sides are insulated with a variety of mineral or synthetic oils, or with oil dipped insulation material, pressboard. The disadvantage of this solution is that it is not or only very complicated to apply to the widespread toroidal transformers today.

In particular, high-voltage transformers require adequate insulation of the transformer itself and of the transformer coils, with respect to the operating voltage or even overvoltages that are significantly higher.

Transformer manufactures and experts suggested different insulation methods to meet these requirements. In a known embodiment, an insulating insert is placed on the toroidal iron core and the primary and secondary coils are wound on the insulating insert. In order to ensure proper insulation between the coils, the primary coil and the secondary coil are arranged in different positions along the circumference of the iron core, thus, due to the separate arrangement the coils are not able to enter into contact with each other, nor to contact the iron core due to the insulating insert. Such a solution is described, for example, in U.S. Pat. No. 6,300,857.

U.S. Pat. No. 4,551,700 describes a toroidal transformer, at which one of the coils, preferably the primary coil arranged on an iron core covered by an insulating layer is also covered by a further insulating layer and another, preferably secondary coil is wound onto this further insulating layer. This solution shows well the present state of the art, i.e. an appropriate insulation is formed on the previously arranged primary coil, and the secondary coil is arranged on that. This solution requires time-consuming and labour-intensive operations.

A toroidal transformer of substantially similar construction is described in EP 0557549 A1 wherein the coils are wound on a two-piece iron core and insulated with resin casting. In this solution, the advantage of fast and easy installation of the coils is lost by the material and time-consuming use of resin casting for insulation, which makes mass production disadvantageous.

A different solution utilizing thermoplastic parts and insulating elements is disclosed in CN 106653300. In this solution, a separating plate is arranged between the transformer input coil and the output coil, and the separating plate and the coil forms are combined by crosslinking into a single integrated part. Although this solution results in a small, compact solution for low-power or non-power transformers, it is not applicable for bulk power transformers or high-voltage transformers.

A solution for encasing a toroidal transformer insulating the transformer coils is described in U.S. Pat. No. 6,753,749 B1 wherein the toroidal transformer provided with coils is placed in a cup-like housing part and a second, also cup-shaped housing part is inserted therein to seal the housing, and the coil terminals of the transformer are led through respective openings of the two cup-like housing halves.

In this solution, a housing part encasing a transformer comprising the toroidal iron core and primary and secondary coils as well as the other housing part that can be fitted as a lid are pre-fabricated and providing a best possible seal is ensured by proper dimensioning of the house parts. With this solution, the transformer is assembled in three steps: completing the transformer, inserting it into the one housing part, closing the unit with the other housing part. However, the breakthrough field strength obtained by this method is limited.

There is always an air gap when fitting plastic surfaces (even with screw threads) thus, depending on the circumstances, the maximum available insulation capacity does not exceed 30-60 kV. To insulate such high voltages, only resin casting or special insulating oils are used in the industry, as there is no air gap between the primary and secondary sides to be insulated.

Thus, there remains a need for a solution that provides proper insulation of the coils of a toroidal transformer, and does not require significant manpower, expertise, and can be done quickly at reasonable cost.

SUMMARY OF THE INVENTION

It has been found that the above requirement can be met by providing an insulation to a part, in particular the iron core of the transformer and the most commonly primary coils or coils applied therewith, which insulation can be simply and easily closed so as to eliminate the possibility of a breakthrough, and furthermore, this construction allows the other, most commonly one or more secondary coils of the transformer to be applied to the transformer part thus prepared in a simple and safe manner. It has also been found that plastics which can and are formed by thermoplastic processes are well suited for this purpose and, in the case of a toroidal transformers; their shape allows this operation to be accomplished with said materials and by rotary friction welding.

This object is solved by a method for insulating at least one coil of a toroidal transformer, wherein one or more coils arranged on a core of the toroidal transformer are externally insulated, and wherein forming the outer electrical insulation of the one or more coils arranged on the iron core comprises:

- forming an opening in an electrically insulating thermoplastic cup receiving an iron core with a coil for leading through terminals of the coil;
- arranging the iron core with the coil in the cup such that the coil terminals are led out of the cup through the opening;
- covering the cup with the inserted iron core and coil with a plastic lid which engages the cup in a form-fitting manner;
- temporarily fixing the cup comprising the iron core and coil in an irrotatable manner;
- joining the cup and the lid by friction welding by pressing the lid placed on the cup against the cup and rotating it in this pressed state until the lid and the cup heat up and the material of the lid and the cup soften and become viscous due to friction;
- after softening of the materials of the lid and cup [pressed together, stopping the rotation of the lid within not more than one second while maintaining the pressure of the lid and the cup;
- at maintained pressure joining the lid and the cup by their mixed material to form a continuous electrical insulation; and
- after cooling down and solidification of the materials of the joined lid and cup, removing the temporary fixing of the cup.

The main advantage of the method according to the invention lies in its speed and simplicity: the iron core with the one or more coils can be simply and securely placed in its receiving cup by leading the terminals of the one or more coils through an aperture formed in the cup for this purpose, and placing an another element, a lid element on the cup containing the iron core and one or more coils, and rotating and simultaneously pressing the two elements against each other thus joining the two elements by friction welding. This operation can be carried out very quickly in a matter of seconds and the elements joined by friction welding ensure an insulation of the transformer parts inside the cup flawlessly without any air gap. The one or more coils of the transformer can be arranged on the sealed and bonded cup in the usual manner for toroidal transformers. It will be readily appreciated that the sealing provided in this manner will provide complete insulation of the toroidal transformer and its coils, so that it can be applied to almost any high voltage depending on dimensioning. In case of friction welding, the operating time is essentially a cooling time of up to half an hour. This solution allows for a much more compact, smaller transformer insulation than either oil or resin casting.

Mentioned and other features and characteristics of the method according to the present invention will be further elucidated and discussed with reference to a following embodiment. In relation to such a description reference will be made to the figures wherein:

BRIEF DESCRIPTION OF THE DRAWINGS

FIG. 1 shows a schematic perspective drawing of a toroidal transformer, manufactured by one possible, advantageous way of the method according to the invention, FIG. 2 shows a view from above to the top of the transformer according to FIG. 1, FIG. 3 shows schematically a section A-A of the insulation of the transformer according to FIG. 1.

DETAILED DESCRIPTION OF PREFERRED EMBODIMENTS

FIG. 1 shows a transformer part provided with an insulation manufactured by a method according to the invention. It will be appreciated that transformer part comprising the annular iron core and the coil formed thereon is received by a pot-like insulating casing of a size substantially adjusted to the size of the transformer part. The center of the pot-like insulating casing is obviously open so that the other one or more coils of the transformer can be formed in known manner.

The insulating casing is constructed from a cup 1 and a lid 2 sealing the cup 1, and a sleeve 3 connected to the lid 2 serves to internally guide the coil terminals of the coil. According to the invention, cup 1 and lid 2 as well as lid 2 and sleeve 3 are joined by rotary friction welding.

FIG. 2 shows a better view of an opening 4 formed in the cup 1 for leading-through of said coil terminals (not shown in the drawing), as well as outer ribs 5 and inner ribs 7 surrounding a middle part 6 for promoting mechanical stability and mounting.

FIG. 3 is a schematic sectional view showing the cup 1, the lid 2, the sleeve 3, and the toroidal iron core 8 symbolically depicted, which also supports a boil not shown in the figure. The cup 1 surrounds the iron core 8 and coil assembly from the outside, the inside and the bottom as a trough. An outer peripheral wall 10 and an inner wall 9 of the cup 1 are of the same size and are higher than the sum of heights of the inserted iron core 8 and coil. In this way, the lid 2 can contact the cup 1 and is able to be bonded to it by the friction welding and not to the iron core 8 or the coil arranged thereon. On the inner side of the lid 2, connected to the cup 1, grooves 11, 12 are formed in relation to the outer and inner walls 10, 9 of the cup 1, facilitating a coaxial assembly and position of the lid 2 and the cup 1 and increasing the length of the friction welded surface respectively.

Easy reliable welding and high insulating capacity are the key to choosing the material used.

In the shown preferred embodiment of the method, polyethylene of the type Docalene HD3000 (HDPE) is used as the material for cup 1, lid 2, sleeve 3, but many types of polyethylenes, polyoxymethylenes are suitable for this purpose, and even any weldable plastic material can be used, provided having adequate electrical insulation capacity. An example of such suitable material is Docacetal C Polyoxymethylene.

In the exemplary method shown, where said sleeve 3 is used, the cup, lid 2, sleeve 3 is friction welded by a milling machine of the type Ruhla 1060, but of course other equipment may be used provided that it satisfies the requirement of relative rotation and simultaneous pressure.

In a first step, the still empty cup 1 is temporarily fixed on the milling machine workbench and the sleeve 3 is fixed in the rotor of the milling machine in the same axis as the opening 4, and pressed against the outside of the cup 1 where a lateral pressure force of 10 newtons (N) is applied. The sleeve 3 is then rotated at 500 rpm. As a result, friction between the outer surface of the cup 1 and the contact end of the sleeve 3 generates heat, causes the material of the cup 1 and the sleeve 3 to soften and become viscous. The rotation of the sleeve 3 is then stopped as soon as possible, in practice in less than 1 seconds (s) preferably in 0.5 s, and since pressure is still applied in the softened state, the mechanical motion of the process mixes the materials to create a bond.

Of course, the speed of the rotation, the pressure force and time of pressure are closely related. Higher rotational speeds can be applied with less force, which affects the time of operation in a known manner. According to our experiments, rotary friction welding of the cup 1 and the lid 2 is performed preferably at a relative rotation of 400-500 rpm, while the friction welding of the cup 1 and the sleeve 3 is performed preferably at a relative rotation of 450-550 rpm. In latter case the pressure force may be kept lower than at the friction welding of the cup 1 and the lid 2, at which twice the pressure force is applied. The exact value of the latter is irrelevant; a difference of 10% does not adversely affect the result of the operation.

In the next step, the thus-welded cup and sleeve assembly 1 is clamped with access to the inside thereof, in which case the sleeve 3 is looking down. The toroidal iron core 8 and coil assembly will be inserted between the walls 9 and 10 of the cup 1.

The cover 2 is then connected to a suitable rotary tool, such as the aforementioned milling machine, here, if necessary, a suitable aluminum or even stainless steel tool may be used to prevent the milling machine from deforming the lid 2. The clamped lid 2 is aligned with the cup 1 so that the two elements are coaxial, and in the example shown, the lid 2 is pressed laterally against the cup 1 with a pressure force of 20 N. During this process, the outer free ends of the walls 9 and 10 of the cup 1 "sit" in said grooves 11, 12 of the lid 2 and fill them macroscopically almost completely. However, a microscopic gap remains between the primary and secondary sides, but does not interfere with or affect the achievement of the intended purpose. The lid 2 is then rotated at 500 rpm. In this way, portions of the walls 9 and 10 of the cup 1 inserted in the grooves 11, 12 of the lid 2, as well partly the grooves receiving said wall portions also heat up due to friction which causes the material of the mentioned parts to soften and become viscous. The rotation of the lid 2 is then stopped as soon as possible, in practice in less than 1 s, preferably in 0.5 s, and since pressure is still applied in the softened state, the mechanical motion of the process mixes the materials to create a bond.

To provide a suitable connection, the required amount of material is provided by sizing the walls 9, 10 and the grooves 11, 12. In the example shown, the thickness of the wall 9 and the wall 10 were chosen as 8 mm and the depth of the grooves 11, 12 as 5 mm. The width of the latter is, of course, adapted to the width of the wall 9 and the wall 10, but these values also depend on the particular dimensions at hand.

The flow of the materials participating in the friction welding can be visually detected and, upon sensing, the rotation of the rotated member is stopped within 1 second to prevent the softened material from moving during cooling. The applied pressure force is only released after the materials have solidified, when the two elements have cured.

Subsequently, the lid 2 is released from the rotating tool, the temporary fixation of the cup 1 is removed, and one or more secondary windings can be applied to the finished insulation of the toroidal transformer in a manner known in the art.

Use of the 3 sleeve is not essential under certain operating conditions. If used, its length depends on the voltage of the application, at a voltage of 60 kV approx. 150 mm is sufficient, at a voltage of 120 kV approx. 250 mm is required, and so on. The breakdown voltage is known to be a non-linear function of the distance. Depending on the application, increasing the creep-rupture strength can be accomplished by corrugation of the 3 sleeve if necessary.

Terminals of the one or more coils situated on the toroidal iron core 8 inserted into the cup 1 are led through the opening 4 and the sleeve 3 so they do not move during friction welding.

It is also possible to fill the interior of the cup 1 closed by the lid 2 with insulating oil known in the art through the sleeve 3 or, if not used, through the opening 4, which further enhances the insulation breakdown. To this end, the iron core 8 and coil assembly has to be placed on suitable spacers inside the plastic cup 1 so that the oil can flow in all directions. In our experiments this was not necessary up to a nominal voltage difference of 120 kV, but it may be necessary at higher voltages.

LIST OF REFERENCE SIGNS

1 cup
2 lid
3 sleeve
4 opening
5 rib
6 middle part
7 rib
8 iron core
9 wall
10 wall
11 groove
12 groove.

The invention claimed is:

1. A method for insulating at least one coil of a toroidal transformer, wherein the at least one coil arranged on a core of the toroidal transformer is externally insulated, by forming outer electrical insulation of the at least one coil arranged on the core and comprising:

forming an opening in an electrically insulating thermoplastic cup receiving the core with the at least one coil for leading through terminals of the at least one coil;

arranging the core with the at least one coil in the cup such that the terminals are led out of the cup through the opening;

covering the cup with the inserted core and at least one coil with a plastic lid which engages the cup in a form-fitting manner;

temporarily fixing the cup comprising the core and at least one coil in an irrotatable manner;

joining the cup and the lid by friction welding by pressing the lid against the cup and rotating the lid in this pressed state until the lid and the cup heat up and the lid and the cup soften and become viscous due to friction;

after softening of the lid and cup pressed together, stopping the rotation of the lid within not more than one second while maintaining the pressure of the lid and the cup;

at maintained pressure joining the lid and the cup to form a continuous electrical insulation; and after cooling down and solidification of the materials of the joined lid and cup, removing the temporary fixing of the cup.

2. The method according to claim 1, further comprising after forming the opening in the cup:

pressing a thermoplastic sleeve, serving for insulated leading of the coil terminals led through the opening, to an outer side of the cup with a pressure force of N+5% and coaxially aligned to the opening;

while maintaining the pressure, rotating the sleeve at a speed in a range of 450-550 rpm until the cup and the sleeve soften and become viscous due to friction;

after softening the cup and sleeve pressed together, stopping the rotation of the sleeve within not more than one second while maintaining pressure on the cup and sleeve; and at a maintained pressure, joining the cup and the sleeve.

3. The method according to claim 2, comprising the step of stopping the rotation of the sleeve after the joining within 0.5 second.

4. The method according to claim 1, comprising the step of pressing the lid against the cup with a force of 20 newtons (N)+5% and rotating the lid at a speed in a range of 400-500 revolutions per minute (rpm).

5. The method according to claim 1, comprising the step of stopping the rotation of the lid after fusion of the lid with the cup within one second.

6. The method according to claim 1, wherein the cup and the lid are made of polyethylene or polyoxymethylene.

7. The method according to claim 2, wherein the electrical insulation is made of polyethylene or polyoxymethylene.

* * * * *